US009467332B2

United States Patent
O'Connor et al.

(10) Patent No.: US 9,467,332 B2
(45) Date of Patent: Oct. 11, 2016

(54) NODE FAILURE DETECTION FOR DISTRIBUTED LINEAR PROTECTION

(71) Applicant: Fujitsu Limited, Kanagawa (JP)

(72) Inventors: Donald O'Connor, McKinney, TX (US); Virgil Vladescu, Hillsdale, NJ (US)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 13/768,857

(22) Filed: Feb. 15, 2013

(65) Prior Publication Data

US 2014/0233373 A1   Aug. 21, 2014

(51) Int. Cl.

| G01R 31/08 | (2006.01) |
|---|---|
| G06F 11/00 | (2006.01) |
| H04J 1/16 | (2006.01) |
| H04J 3/14 | (2006.01) |
| H04L 12/24 | (2006.01) |

(52) U.S. Cl.
CPC .................. *H04L 41/0663* (2013.01)

(58) Field of Classification Search
CPC ............... H04L 12/24; H04L 41/0654; H04L 41/0063; G01R 31/08; G06F 11/00; H04W 52/0235
USPC .................................................. 370/328, 311
See application file for complete search history.

(56) References Cited

U.S. PATENT DOCUMENTS

| 6,332,198 B1 * | 12/2001 | Simons .................... G06F 1/14 370/217 |
|---|---|---|
| 6,848,062 B1 | 1/2005 | Desai et al. .................. 714/4.1 |
| 8,675,479 B2 * | 3/2014 | Cirkovic ............. H04L 43/0811 370/228 |
| 2002/0080445 A1 | 6/2002 | Falkenstein et al. ......... 359/127 |
| 2005/0195807 A1 | 9/2005 | Rao et al. ..................... 370/386 |
| 2007/0086364 A1 | 4/2007 | Ellis et al. .................... 370/258 |
| 2010/0287405 A1 * | 11/2010 | Soon .................. H04L 43/0817 714/4.1 |
| 2012/0120793 A1 * | 5/2012 | Corti ............................ 370/228 |
| 2012/0294140 A1 | 11/2012 | Cheung et al. ............... 370/216 |
| 2013/0071117 A1 | 3/2013 | Pan et al. ........................ 398/45 |
| 2014/0286154 A1 | 9/2014 | O'Connor et al. ........... 370/218 |

OTHER PUBLICATIONS

C1580, "G.873.1 Amendment", ITU-T SG15 Study Period 2009-2012, 16 pages, Oct. 2012.

(Continued)

*Primary Examiner* — Andrew Chriss
*Assistant Examiner* — Voster Preval
(74) *Attorney, Agent, or Firm* — Baker Botts L.L.P.

(57) ABSTRACT

A system includes a network element communicatively coupled to another network element through an intraportal link forming a node portal. The network element is communicatively coupled to a source network element within a network attached to the node portal. The network element is configured to monitor a protect path for an automatic protection switching ("APS") message from the source network element, determine that the APS message has been received, monitor an intraportal link for an expected message from the other network element, determine that the expected message has not been received, monitor integrity of the intraportal link, determine that the intraportal link has failed and determine that the other network element has failed based upon determining that that the APS message has been received, that the expected message has not been received, and that the intraportal link has failed.

26 Claims, 12 Drawing Sheets

(56) References Cited

OTHER PUBLICATIONS

Martini, Luca, et al.; "Inter-Chassis Communication Protocol for L2VPN PE Redundancy (ICCP);" draft-ietf-pwe3-iccp-09.txt; http://tools.ietf.org/html/draft-ietf-pwe3-iccp-09; 80 pages, Jul. 30, 2012.
802.1AX™-2008—IEEE Standard for Local and metropolitan area networks—Link Aggregation; 163 pages, Nov. 3, 2008.
G.873.1, "Optical Transport Network (OTN): Linear protection", Jul. 2011, 30 pages, Jul. 2011.
Pseudowire Redundancy, "draft-ietf-pwe3-redundancy-05.txt", Sep. 2011.
Pseudowire Preferential forwarding Status Bit, "draft-ietf-pwe3-redundancy-bit-03.txt", May 2010.
Fujitsu, "Flashwave® 9500 Packet Optical Networking Platform", 10 pages, 2014.
IEEE P802.1AX, Local and metropolitan area networks—Link Aggregation Amendment 1: Protocol Addressing, IEEE Computer Society, 60 pages, Mar. 29, 2012.
U.S. Office Action issued in U.S. Appl. No. 13/848,478; 7 pages, Mar. 11, 2015.
Notice of Allowance issued in U.S. Appl. No. 13/848,478; 7 pages, Jun. 29, 2015.
RFC 1136 "Administrative Domains and Routing Domains a Model for Routing in the Internet", 20 pages, Dec. 1989.

\* cited by examiner

NODE FAILURE DETECTION FOR DISTRIBUTED LINEAR PROTECTION

TECHNICAL FIELD OF THE INVENTION

The present invention relates generally to networked communications and, more particularly, to node failure detection for distributed linear protection.

BACKGROUND

Ethernet, Optical Transport Network (OTN), and Multi-protocol Label Switching Transport Profile (MPLS-TP) automatic protection switching under linear protection standards—such as the G.8031 Ethernet Linear Protection, G.873.1 OTN Linear Protection, or MPLS-TP Linear Protection G.8131.1 and G.8131.2 standards—may use protected paths, such as a working path and a protect path, to communicate between virtual local area networks. The paths are monitored, and if one of the paths is detected as faulty, the backup path may take over and traffic continues to flow. The standards have heretofore dictated the specific protocol for switching traffic between the paths in a variety of circumstances.

SUMMARY

In one embodiment, a method for linear protection is for a network element communicatively coupled to another network element, wherein the network element and the other network element are included in a node portal located at the edge of an administrative network domain. The method includes monitoring a protect path for an automatic protection switching ("APS") message from a source network element within a network attached to the node portal indicating a failure of a working path, determining that the APS message has been received, monitoring an intraportal link for an expected message from the other network element, determining that the expected message has not been received, monitoring integrity of the intraportal link, determining that the intraportal link has failed, and determining that the other network element has failed based upon determining that that the APS message has been received, that the expected message has not been received, and that the intraportal link has failed. The working path is between the other network element and the source network element.

In another embodiment, a method for linear protection includes determining, at a node portal, a failure in another node portal and changing a switch position of a selector function in the node portal in response to determining the failure in the other node portal. The node portal is communicatively coupled to the other node portal across an administrative network domain. Changing the switch position includes maintaining communication over a working path between the first node portal with a network element in a network attached to the first node portal.

In yet another embodiment, an article of manufacture includes a computer readable medium and computer-executable instructions carried on the computer readable medium. The instructions are readable by a processor. The instructions, when read and executed, cause the processor, for a network element communicatively coupled to another network element in a node portal located at the edge of an administrative network domain, to monitor a protect path for an APS message from a source network element, determine that the APS message has been received, monitor an intraportal link for an expected message from the other network element, determine that the expected message has not been received, monitor integrity of the intraportal link, determine that the intraportal link has failed, and determine that the other network element has failed based upon determining that that the APS message has been received, that the expected message has not been received, and that the intraportal link has failed. The APS message indicates a failure of a working path. The source network element is within a network attached to the node portal. The working path is between the other network element and the source network element.

In still yet another embodiment, an article of manufacture includes a computer readable medium and computer-executable instructions carried on the computer readable medium. The instructions are readable by a processor. The instructions, when read and executed, cause the processor to determine—at a node portal—failure in another node portal, and change a switch position of a selector function in the node portal in response to determining the failure in the other node portal. The node portal is communicatively coupled to the other node portal across an administrative network domain. Changing the switch position includes maintaining communication over a working path between the first node portal with a network element in a network attached to the first node portal.

In yet another embodiment, a system includes a network element communicatively coupled to another network element through an intraportal link forming a node portal. The network element is communicatively coupled to a source network element within a network attached to the node portal. The network element is configured to monitor a protect path for an APS message from the source network element, determine that the APS message has been received, monitor an intraportal link for an expected message from the other network element, determine that the expected message has not been received, monitor integrity of the intraportal link, determine that the intraportal link has failed and determine that the other network element has failed based upon determining that that the APS message has been received, that the expected message has not been received, and that the intraportal link has failed.

In still yet another embodiment, a system includes a node portal communicatively coupled to another node portal across an administrative network domain. The node portal is configured to determine a failure in another node portal and change a switch position of a selector function in the node portal in response to determining the failure in the other node portal. Changing the switch position includes maintaining communication over a working path between the first node portal with a network element in a network attached to the first node portal.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
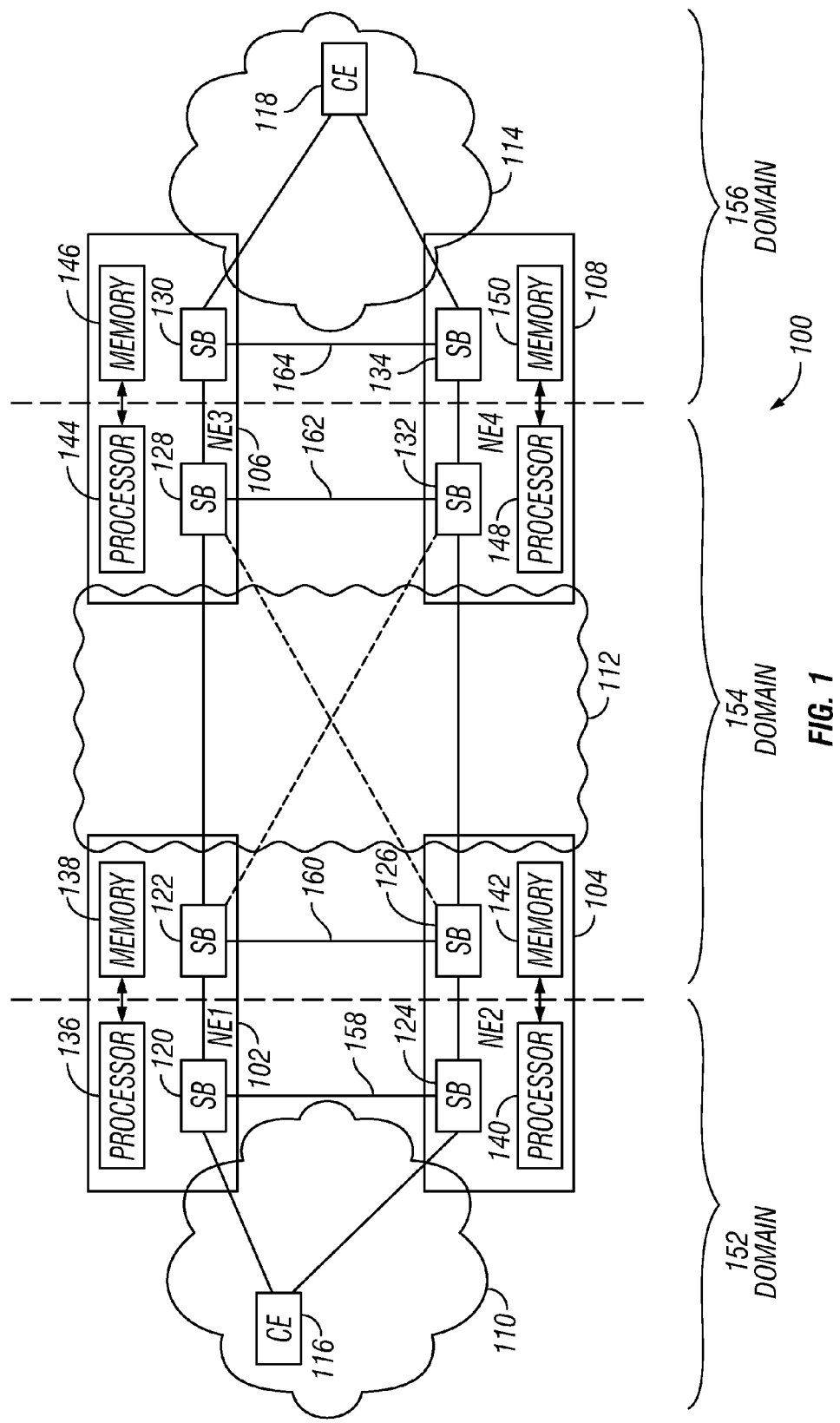
FIG. 1 is an illustration of example embodiment of a system for providing node failure detection.

FIG. 1 is an example embodiment of a system 100 for providing node failure detection. Such failure detection may be made in conjunction with providing linear protection for communication links in system 100. The linear protection may include distributed linear protection. For example, system 100 may utilize G.8031 Ethernet Linear Protection, G.873.1 Optical Transport Network (OTN) Linear Protection, Multiprotocol Label Switching Transport Profile (MPLS-TP) Linear Protection G.8131.1, or MPLS-TP Linear Protection G.8131.2 standards. System 100 may be configured to provide node failure detection such that various elements of system 100 may instantiate protection connections to maintain communication links. In one embodiment, system 100 may be configured to provide node failure detection when using mesh distributed linear protection. In another embodiment, system 100 may be configured to provide node protection when using ring distributed linear protection. In yet another embodiment, system 100 may be configured to provide node protection when using a hybrid between ring and mesh distributed linear protection.

System 100 may include any suitable number and kind of network elements (NE). For example, system 100 may include NE1 102, NE2 104, NE3 106, and NE4 108. NE1 102 and NE2 104 may be communicatively coupled. Furthermore, NE3 106 and NE4 108 may be communicatively coupled. In addition, NE1 and NE3 may be communicatively coupled and NE2 and NE4 may be communicatively coupled. Depending upon the communication model used to implement system 100, NE1 102 and NE4 108 may be communicatively coupled and NE2 104 and NE3 may be communicatively coupled.

NE1 102, NE2 104, NE3 106, and NE4 108 may be implemented in any suitable manner. For example, NE1 102, NE2 104, NE3 106, and NE4 108 may be implemented as a network switch, router, server, line card, or other suitable electronic or optical device. Each of NE1 102, NE2 104, NE3 106, and NE4 108 may include a processor 136, 140, 144, 148, respectively, communicatively coupled to a memory 138, 142, 146, 150, respectively. Processors 136, 140, 144, 148 may each comprise, for example, a microprocessor, microcontroller, digital signal processor (DSP), application specific integrated circuit (ASIC), or any other digital or analog circuitry configured to interpret and/or execute program instructions and/or process data. Processors 136, 140, 144, 148 may interpret and/or execute program instructions and/or process data stored in respective ones of memories 138, 142, 146, 150. Memories 138, 142, 146, 150 may comprise any system, device, or apparatus configured to hold and/or house one or more memory modules. Each memory module may include any system, device or apparatus configured to retain program instructions and/or data for a period of time (e.g., computer-readable media). The configuration and operation of NE1 102, NE2 104, NE3 106, and NE4 108 may be partially or fully implemented by instructions on memories 138, 142, 146, 150, respectively, when loaded and executed by processors 136, 140, 144, 148.

Each of NE1 102, NE2 104, NE3 106, and NE4 108 may further include a pair of selector and bridge (SB) devices. For example, NE1 102 may include SBs 120, 122; NE2 104 may include SBs 124, 126; NE3 106 may include SBs 128, 130; and NE4 108 may include SBs 132, 134. Each SB may include the ability to selectively route signals between two of its inputs. Each SB may be implemented in any suitable manner, such as by a switch controlled by the respective NE in which the SB resides. Each pair of SBs within the respective ones of NE1 102, NE2 104, NE3 106, and NE4 108 may be communicatively coupled to each other. Furthermore, the SBs within the respective ones of NE1 102, NE2 104, NE3 106, and NE4 108 may be communicatively coupled to two or more other elements of system 100. Thus, the communicative coupling between NEs 102, 104, 106, 108 may be determined by the configuration of their respective SBs. For example, SB 120 of NE1 102 may be communicatively coupled to SB 124 of NE2 and to a computing element (CE) 116; SB 122 of NE1 102 may be communicatively coupled to SB 126 of NE2 and to SB 128 of NE3; SB 124 of NE2 104 may be communicatively coupled to CE 116; SB 126 of NE2 104 may be communicatively coupled to SB 132 of NE4; SB 128 of NE3 106 may be communicatively coupled to SB 132 of NE4; SB 130 of NE3 106 may be communicatively coupled to SB 134 of NE4 108 and to a CE 118; and SB 134 of NE4 108 may be communicatively coupled to CE 118. Depending upon the communication model used to implement system 100, SB 122 of NE1 102 may be communicatively coupled to SB 132 of NE4 108 and SB 126 of NE2 104 may be communicatively coupled to SB 128 of NE3 106.

System 100 may be configured according to any suitable reference model. Such a reference model may be established according to the standard or protocol used in distributed linear protection. For example, in one embodiment, system 100 may be configured according to a Network to External Network-Network Interface (N2E) reference model. In such a model, NE1 102 and NE2 104 may form a first portal from which input/output is received/sent from network 110. NE3 106 and NE4 108 may form a second portal in which input/output is received/sent from network 114. NE1 106 may be communicatively coupled to NE4 108 through SBs 122, 132, and NE2 108 may be communicatively coupled to NE3 106 through SBs 126, 128. Furthermore, in such a model, a first domain 152 may be formed by the combination of network 110 and SBs 120, 124. Such a domain 152 may include a first OTN, Ethernet, or MPLS-TP protection domain. A domain 154 may be formed by the combination of SBs 122, 126, 128, 132. Such a domain 154 may include an External Network-Network Interface (E-NNI) protection domain configured for OTN or Ethernet. In addition, a domain 156 may be formed by the combination of network 114 and SBs 130, 134. Such a domain 156 may include a second OTN, Ethernet, or MPLS-TP protection domain. The portals formed by the combination of NE1 102 and NE2 104, and by NE3 106 and NE4 108, may form E-NNI portals.

Domains 152, 154, 156 may each implement an administrative network domain. Such an administrative network domain may be managed as a single, unitary network. Portals, such as those formed by a suitable combination of NE1 102, NE2 104, NE3 106, and NE4 108, may implement an ingress or egress into an administrative network domain such that an entity managing the network domain may control the transmission of information in or out of the network domain through control or management of the respective portal. Thus, a portal may be located at the logical edge of an administrative network domain.

In another example, system 100 may be configured according to a Network to User Network Interface (N2U) Reference Model. In such a model, NE1 102 and NE2 104 may form a first portal from which input/output is received/sent from CE 116 and received/sent from network 110. NE3 106 and NE4 108 may form a second portal in which input/output is received/sent from network 114. Furthermore, in such a model, a first domain 152 may be formed by the combination of CE 116 and SBs 120, 124. Such a domain 152 may include an Ethernet User Network Interface (UNI) protection domain. A UNI may be established between CE 116 and the pair of SBs 120, 124.

In yet another example, system 100 may be configured according to a Network to Network (N2N) Reference Model. In such a model, NE1 102 and NE2 104 may form a first portal from which input/output is received/sent from network 110. NE3 106 and NE4 108 may form a second portal in which input/output is receive/sent from network 114. Furthermore, in such a model, a first domain 152 may be formed by the combination of network 110 and SBs 120, 124, and a second domain 156 may be formed by the combination of network 114 and SBs 130, 134.

A domain 154 may be formed by the combination of SBs 122, 126, 128, 132 and network 112. Such a domain 154 may include an Ethernet, MPLS-TP, or OTN Network protection domain. An E-NNI may be established between SBs 130, 134 and any up-network recipients, such as network 114 or CE 118. The portal formed by the combination of NE1 102 and NE2 104 may include a UNI portal. The portal formed by the combination of NE3 106 and NE4 108 may form an E-NNI portal.

The portals formed by NE1 102 and NE2 104, and by NE3 106 and NE4 108, may be collocated within the same device or geographically dispersed and interconnected through a network. In order to communicatively couple portions of a single portal (such as, for example, NE1 102 and NE2 104), the portal may include one or more intraportal links (IPL) 158, 160, 162, 164. Each of IPLs 158, 160, 162, 164 may include a physical link and a logical link. IPLs 158, 160, 162, 164 may be configured to carry data plane traffic, automatic protection switching (APS) messages, and other monitoring messages that a given one of NE1 102, NE2 104, NE3 106, and NE4 108 may use to monitor the status of another one of NE1 102, NE2 104, NE3 106, and NE4 108 within the same portal.

The utilization of IPLs 158, 160, 162, 164 may depend upon the configuration of system 100. For example, when using an N2E model in a ring configuration, IPL 158 may be active in domain 152 (which may be configured as a first protection domain); IPL 160 and IPL 162 may be active in domain 154 (which may be configured as an E-NNI domain); and IPL 164 may be active in domain 156 (which may be configured as a second protection domain). In another example, when using an N2E model in a mesh configuration, IPL 158 may not be active; IPL 160 and IPL 162 may be active in domain 154 (which may be configured as an E-NNI domain); and IPL 164 may be active in domain 156 (which may be configured as a second protection domain).

Networks 110, 112, 114 may each comprise any suitable network—for example, a local-area-network, wide-area-network, a network of metro Ethernet switches, virtual-local-area-network, optical networks, Ethernet networks, an intranet, or a portion of the Internet. Networks 110, 112, 114 may include elements configured for UNI, E-NNI, or both. Furthermore, networks 110, 112, 114 may include elements be configured to utilize singled-homed or multiple-homed UNI. In such cases wherein multiple-homed UNI, such as double-homed UNI, is used, a customer node may be implemented by CE 116 or CE 118 and may be configured to connect to system 100 to provide UNI edge nodes.

CE 116, 118 may include any suitable entity, such as a server, computer, router, or switch. CE 116, 118 may include an entity within networks 110, 114, respectively. CE 116, 118 may reside in any suitable portion of networks 110, 114, respectively, including at a service edge of such networks.

Entities within system 100 may communicate using linear protected switching and associated linearly protected switching connections. Such connections may include those protected using, for example, the G.8031, G.873.1, G.8131.1, or G.8131.2 standards. Furthermore, such connections may include a working path and a protect path. One of such paths may be designated as active, wherein an NE monitoring the paths for inbound traffic will accept packets from the active path and simply drop data packets from the other path, but still accept control packets required for the operation of a path protection protocol. In one embodiment, the working path may be initially configured as the active path. If the working path is down or otherwise unavailable, then the protect path may be configured as the active path. Each of SBs 120, 122, 124, 126, 128, 130, 132, 134 may be configured to provide routing of information through an active path. System 100 may be configured to determine whether various nodes or links of system 100 are down or inoperable, causing a reconfiguration of active paths, working paths, or protect paths. To affect such reconfiguration, each of NEs 102, 104, 106, 108 may monitor respective protect paths for control and status messages, such as automatic protection switching ("APS") messages. APS messages may implement a control packet, include protocol messages, include property and state information of an originating switch, and may be exchanged using the protect path.

Each of NE1 102, NE2 104, NE3 106, and NE4 108 may be configured to store pre-determined states of operation in memories 138, 142, 146, 150, respectively. Such states may be stored in any suitable manner, such as in a table, record, or other data structure. Each such table may contain indications, for each state, of what actions should be taken given any number of conditions observed.

NE1 102, NE2 104, NE3 106, NE4 108, CE 116, and CE 118 may be configured to periodically exchange APS messages. Such messages may be exchanged one-for-one, and in both directions. Such APS messages may contain information pertaining to the status, state, and operation of a switch to be communicated to another switch. In addition, NE1 102, NE2 104, NE3 106, NE4 108, CE 116, and CE 118 may be configured to periodically exchange "Keep-Alive Messages." Such a keep-alive message may be implemented in any suitable manner by which one entity sends a periodic or expected message to another entity to inform the other entity that the original entity is still functional and operating.

System 100 may utilize one-to-one linear protection. In such a case, user traffic may be transmitted on either of the protect path and working path. However, user traffic may not be transmitted on both the working path and protect path. If an entity attempts to transmit user traffic on working and another entity attempts to transmit user traffic on a corresponding protect path, neither entity will receive the other end's traffic, and the traffic may be lost.

Upon detection of a loss in user traffic, NE1 102, NE2 104, NE3 106, NE4 108, CE 116, and CE 118 may be configured to switch to a different pre-determined state of operation based upon the conditions encountered. Such a state of operation may include directives that the switch move user traffic to from working path to a protect path, or vice-versa.

In the example of FIG. 1, NE2 104 may be configured to determine whether NE1 102, or a link associated with NE1 102, has failed. Similarly, NE1 102 may be configured to determine whether NE2 104, or a link associated with NE2 104, has failed. Furthermore, NE3 106 may be configured to determine whether NE4 108, or a link associated with NE4 108, has failed. Similarly, NE4 108 may be configured to determine whether NE3 106, or a link associated with NE3 106, has failed. If any such failure associated with NE1 102, NE2 104, NE3 106, or NE4 108 is determined, two or more of the other NEs of NE1 102, NE2 104, NE3 106, and NE4 108 may be configured to communicate to perform reconfiguration of network communication links.

Figure 2A:
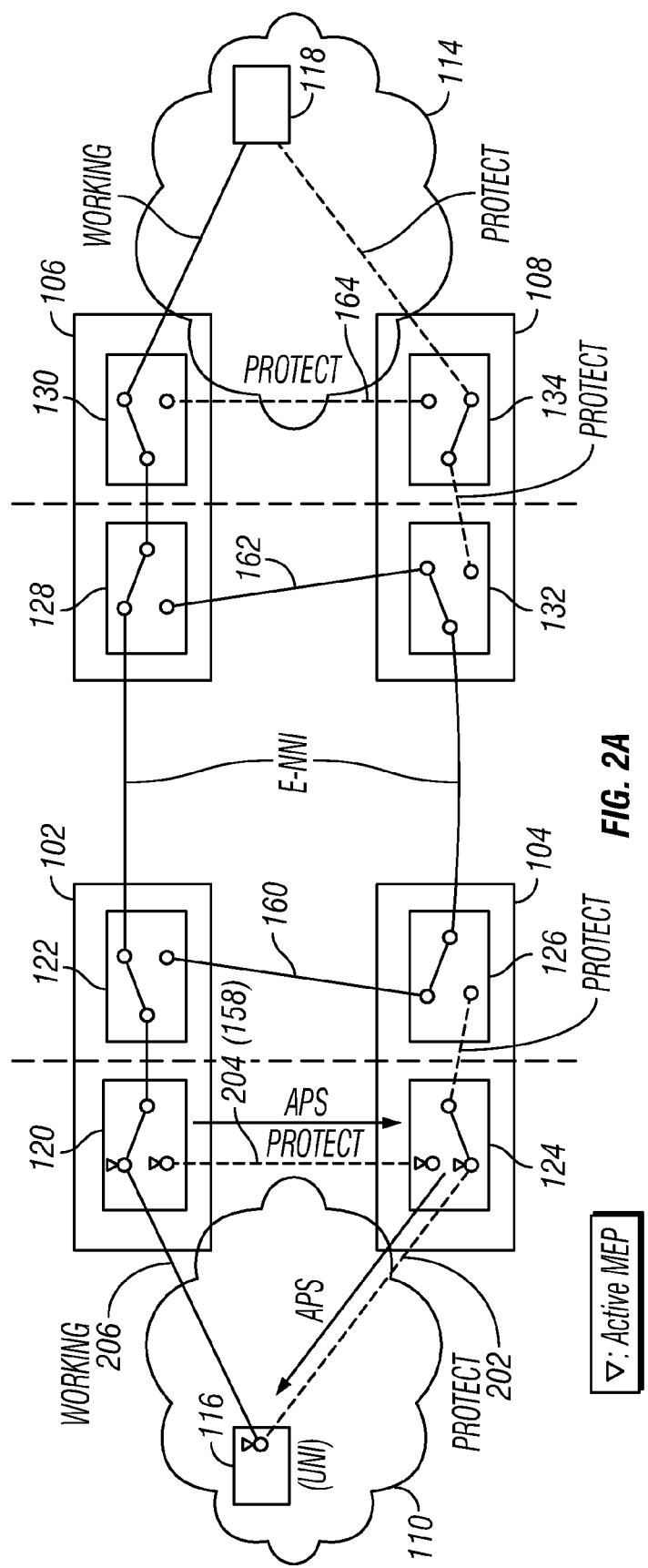
FIG. 2A is an illustration of example operation of a system when using ring distributed linear protection.

In one embodiment, system 100 may be utilized for ring distributed linear protection. FIG. 2A is an illustration of example operation of system 100 when using ring distributed linear protection. In the example of FIG. 2A, NE1 102 and NE2 104 may form a portal for network 110 through which CE 116 communicates. CE 116 may be configured with a UNI. NE1 102 and NE3 106 may form an E-NNI. Furthermore, NE2 104 and NE4 108 may form an E-NNI. NE3 106 and NE4 108 may form a second portal such that CE 118 may communicate through network 114. A path 206 formed through network 110 may connect CE 116 and SB 120 of NE1 102, and a path 202 formed through network 110 may connect CE 116 and SB 124 of NE2 104. A path 204 may be formed connecting SB 120 of NE1 102 and SB 124 of NE2 104. Path 204 may be implemented by, for example, IPL 158. IPLs 158, 160, 162, 164 may be active.

In the example of FIG. 2A, during normal operation a working path may be established between CE 116 and the first portal formed by NE1 102 and NE2 104. Furthermore, during normal operation a protect path may be established between CE 116 and the first portal formed by NE1 102 and NE2 104. For example, path 206 may be initially designated as the working path and path 202 may be initially designated as the protect path. Additionally, path 204 may be designated as a protect path. Other working and protect paths may be established within system 100, such as between SB 130, SB 134, and CE 118.

Each working path and protect path may be independently monitored by a part of maintenance association end points (MEP). The designation of what portions of system 100 are implemented as MEPs may be determined according to the protocols or standards used by system 100. For example, when using OTN, MEPs may include Optical Data Unit k path (ODUkP) termination points. Such ODUkP termination points may include a high-order or low-order ODUk in a given segment using protect and working paths. In such an example, Trail Trace may be used to determine whether an element is functioning correctly in a keep-alive message. In another example, when using Ethernet, MEPs may include Service Operations, Administration, and Maintenance (SOAM) Connectivity Fault Management (CFM) MEPs. These SOAM CFM MEPs may utilize monitoring of Continuity Check Messages (CCM). In yet another example, when using MPLS-TP, MEPs may include specific CFM monitoring endpoints based upon, for example, SOAM CFM (according to the International Telecommunication Union (ITU) 8113.1 specification) or Internet Engineering Task Force (IETF)-defined Bidirectional Forwarding Detection (BFD) (according to the ITU 8113.2 specification). Such endpoints may utilize keep-alive monitoring.

Each of SBs 120, 122, 124, 126, 128, 130, 132, 134 are illustrated with at least three connector points. Each connector point may be communicatively coupled to a node external to the respective SB. Given instructions, commands, or control by their respective NEs, each of SBs 120, 122, 124, 126, 128, 130, 132, 134 may be configured to selectively route input and output by connecting two of the three connector points.

Figure 2B:
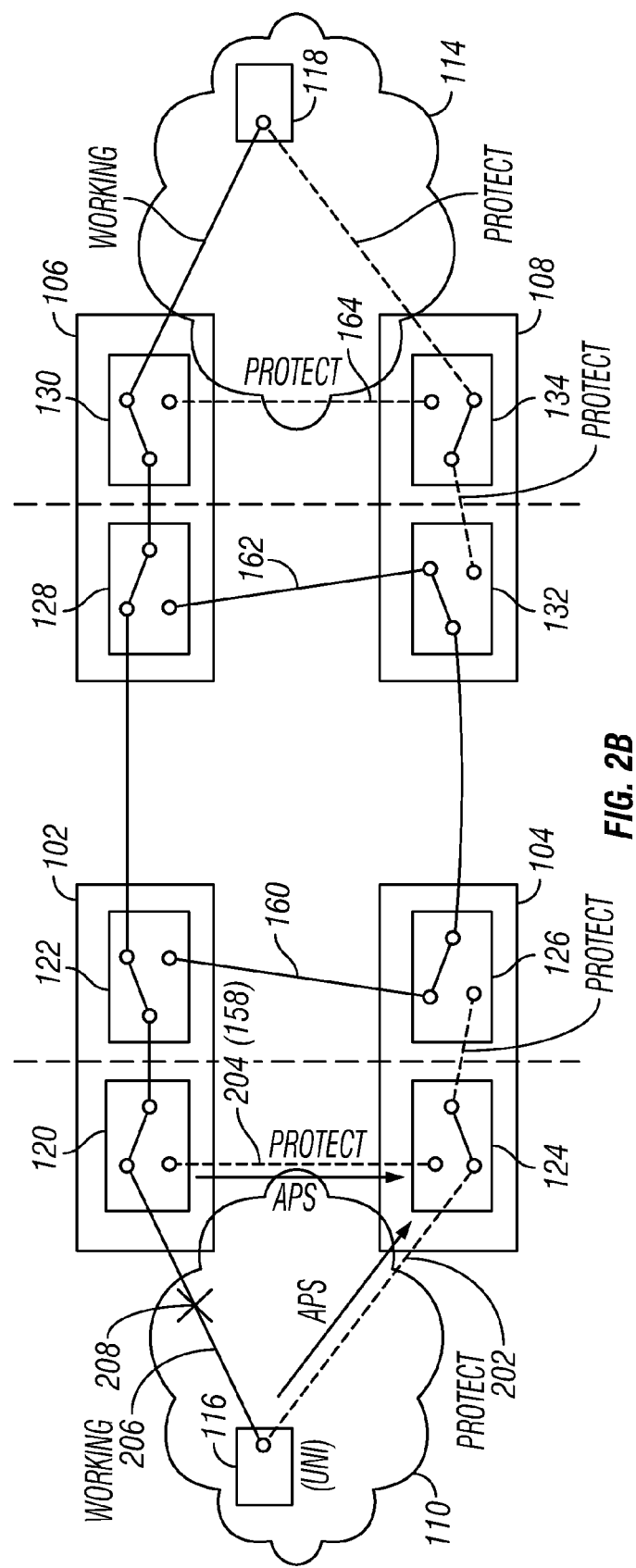
FIG. 2B illustrates example operation of a system to detect link failure when using ring distributed linear protection.

FIG. 2B illustrates example operation of system 100 to detect link failure when using ring distributed linear protection. When path 206 (the working path) fails at 208, CE 116 and NE1 102 may each independently detect the failure. Each may generate an APS message detailing such a determination and send it to NE2 104 along respective paths 202, 204. Thus, NE2 104 receives, independently, APS messages on protect path (path 202) and an IPL (path 204).

Because NE2 104 receives messages indicating failure from both NE1 102 and CE 116, NE2 104 may determine that the path 206 has failed yet NE1 102 has not failed. NE2 104 may determine that the error has occurred somewhere in network 110, rather than internally to NE1 102.

Figure 2C:
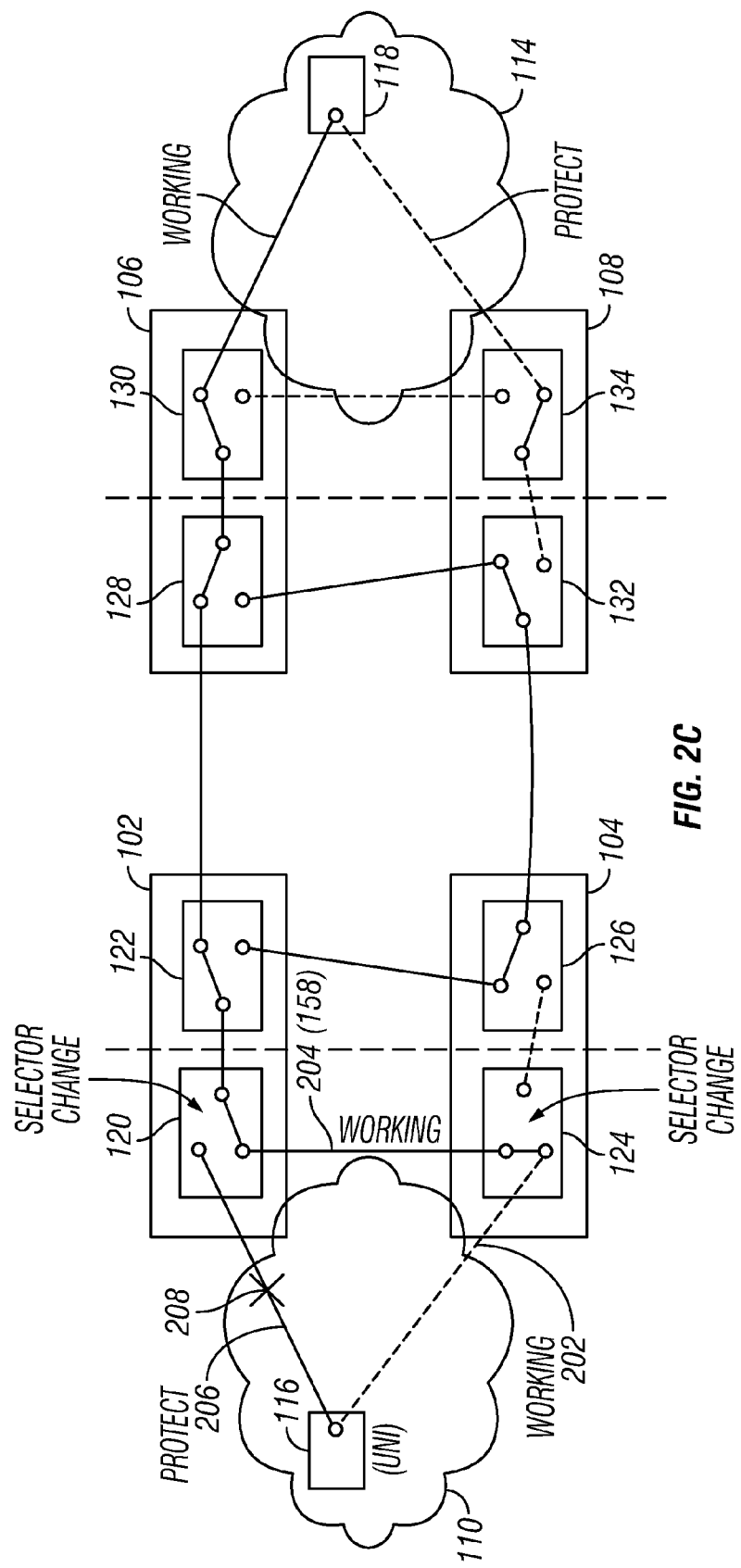
FIG. 2C illustrates example operation of a system to respond to detected link failure when using ring distributed linear protection.

FIG. 2C illustrates example operation of system 100 to respond to detected link failure when using ring distributed linear protection. System 100 may perform any suitable number or combination of selector changes within various SBs 120, 122, 124, 126, 128, 130, 132, 134. For example, NE2 104 may make a selector change in SB 124 to connect path 202 and path 204. Such a change may connect two protect paths. Furthermore, such a change may connect a protect path to CE 116 to the IPL for SB 120 of NE1 102 within the same portal.

In one embodiment, NE2 104 may respond with an APS message to each endpoint—one in NE1 102 and one in CE 116. In another embodiment, NE2 104 may allow APS messages to directly flow between NE1 102 and CE 116. In such an embodiment, NE2 104 may perform any necessary APS translation.

CE 116 and NE1 102 may switch to the protect path built upon paths 202 and 204. The working path may then be designated as paths 202 and 204.

Figure 2D:
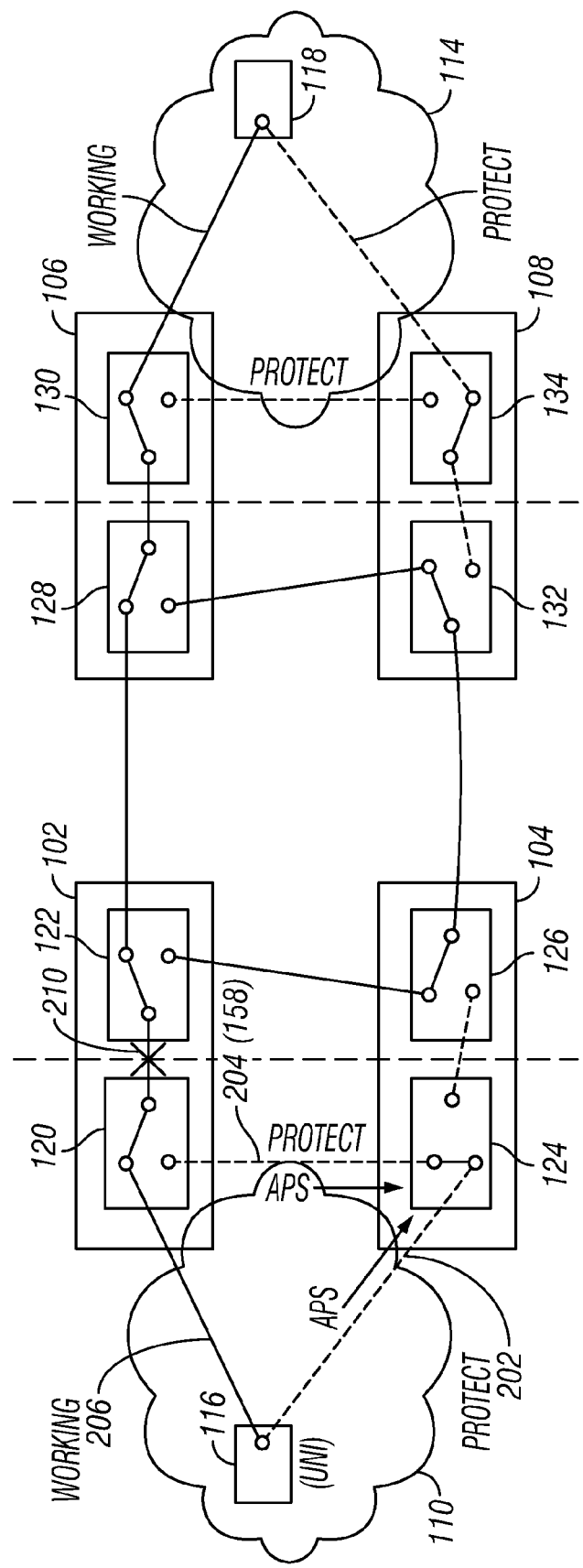
FIG. 2D illustrates example operation of a system to detect node failure when using ring distributed linear protection.

FIG. 2D illustrates example operation of system 100 to detect node failure when using ring distributed linear protection. Recovery from such node failure may be based upon a portal node detecting failure of another node from within the same portal. In one embodiment, system 100 may utilize triangulation to determine node failure.

In the example of FIG. 2D, NE1 102 may fail 210. NE2 104 may detect a resulting APS request from CE 116 over path 202. Furthermore, NE2 104 may fail to receive a message from NE1 102 over path 204. Such a message may be expected if NE1 102 is operating correctly. The message may include, for example, an APS message or keep-alive messages. In addition, NE2 104 may detect a loss of its IPL itself, represented by path 204. NE2 104 may determine, based on the loss of APS messages from NE1 102 or other keep-alive messages, the loss of IPL on path 204, and the APS messages received from CE 116, that NE1 102 has failed.

Figure 2E:
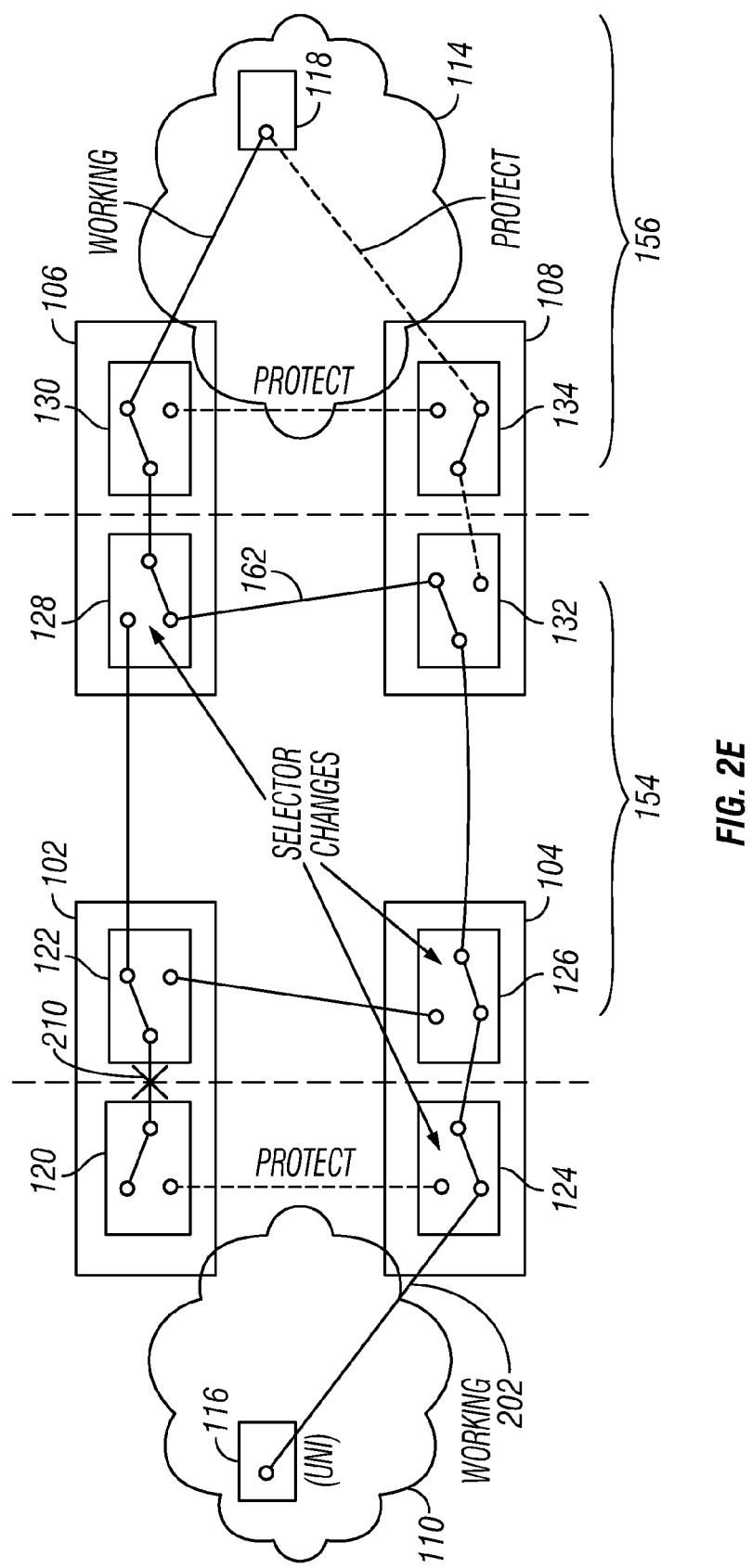
FIG. 2E illustrates example operation of a system to respond to detected node failure when using ring distributed linear protection.

FIG. 2E illustrates example operation of system 100 to respond to detected node failure when using ring distributed linear protection.

NE2 104 may honor the APS request from CE 116. System 100 may perform any suitable number and combination of selector changes. For example, NE2 104 may make a selector change, if necessary, in SB 124 to route path 202 to SB 126, and, if necessary, in SB 126 to route its input from SB 124 to NE4 108. NE2 may activate the protect path on path 202 such that path 202 may now include the working path.

Other elements of domain 154 (configured as an E-NNI domain) may independently also detect failure of NE1 102 and provide similar switching of paths and selector changes within respective SBs. Each of the other elements, such as NE3 106 and NE4 108, may make such determinations in any suitable manner. For example, such other elements may make such determinations in similar fashion as NE2 104. In another example, NE4 108 may make such a determination upon receiving new input or APS messages from CE 116 or NE2 104. NE3 106 may make such a determination upon failing to receive input from NE1 102 and upon receiving new input or APS messages from NE4 108. Upon determining failure of NE1 102, NE4 108 may make a selector change, if necessary, in SB 132 to route its input from SB 126 of NE2 104 to SB 128 of NE3 106. Such routing may thus include routing over the IPL 162 between NE3 106 and NE4 108. NE3 106 may make a selector change, if necessary, in SB 128 to route its input from SB 132 of NE4 108 to SB 130 and on to CE 118. Thus, the protection domain of domain 156 in network 114 may require no changes.

Figure 3A:
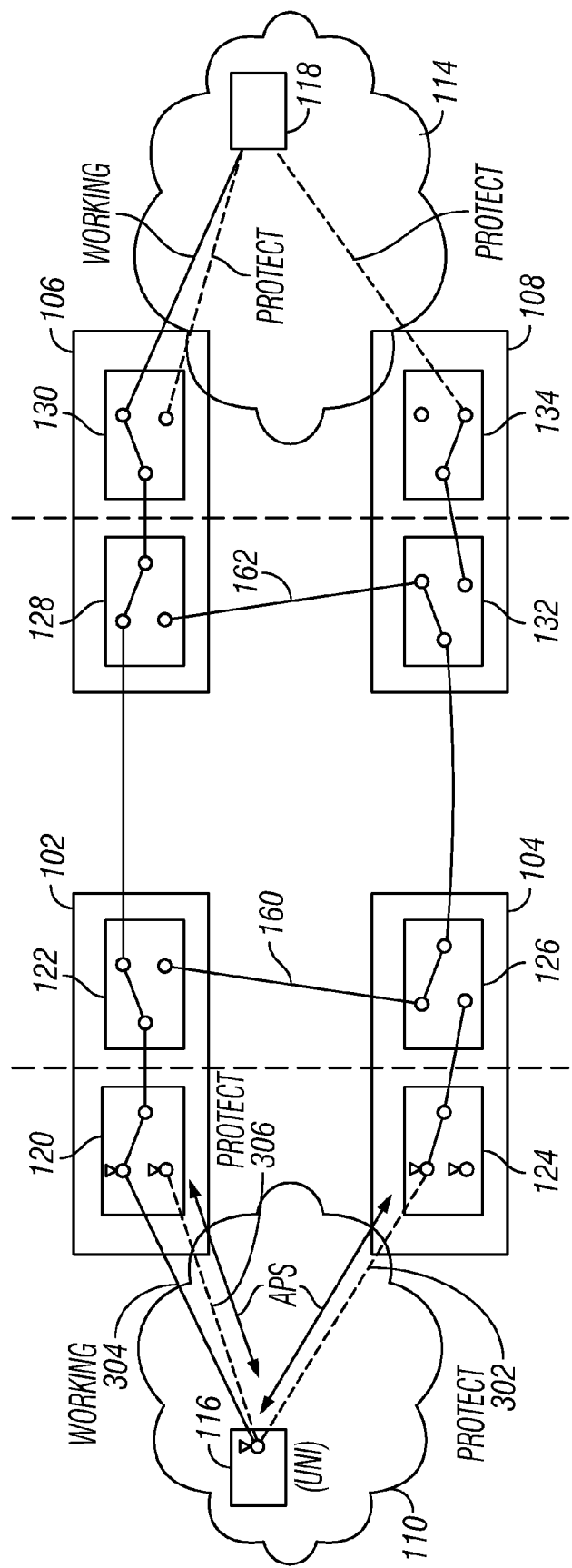
FIG. 3A is an illustration of example operation of a system when using mesh distributed linear protection.

FIG. 3A is an illustration of example operation of system 100 when using mesh distributed linear protection. In the example of FIG. 3A, NE1 102 and NE2 104 may form a portal for network 110 through which CE 116 communicates. CE 116 may be configured with a UNI. NE1 102 and NE3 106 may form an E-NNI. Furthermore, NE2 104 and NE4 108 may form an E-NNI. NE3 106 and NE4 108 may form a second portal such that CE 118 may communicate through network 114. Two paths 304, 306 formed through network 110 may connect CE 116 and SB 120 of NE1 102. A path 302 formed through network 110 may connect CE 116 and SB 124 of NE2 104. An IPL between SB 120 of NE1 102 and SB 124 of NE2 104 may be absent or inactive. IPLs 160, 162 may be active.

In the example of FIG. 3A, during normal operation a working path may be established between CE 116 and the first portal formed by NE1 102 and NE2 104 along path 304. Furthermore, during normal operation protect paths may be established between CE 116 and the first portal formed by NE1 102 and NE2 104 along paths 306 and 302.

Thus, path 304 may be initially designated as the working path and paths 302, 306 may be initially designated as the protect path. Other working and protect paths may be established within system 100, such as between SB 130, SB 134, and CE 118.

Figure 3B:
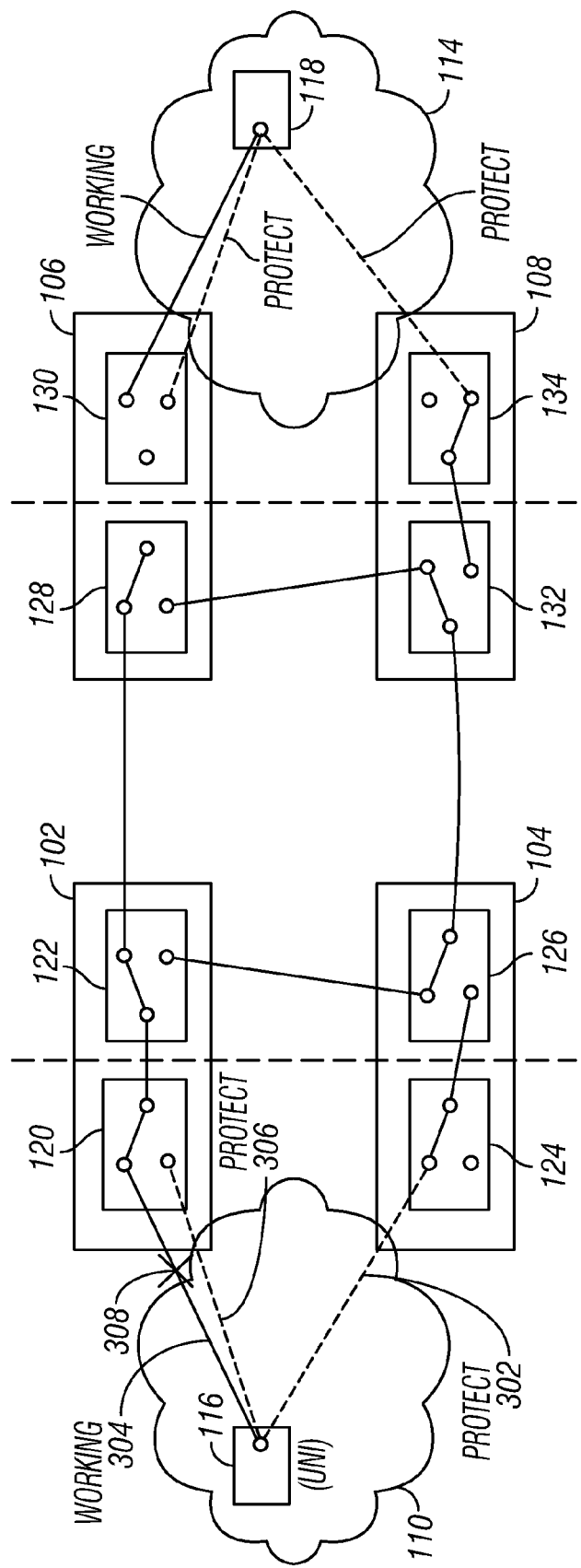
FIG. 3B illustrates example operation of a system to detect link failure when using mesh distributed linear protection.

FIG. 3B illustrates example operation of system 100 to detect link failure when using mesh distributed linear protection. When path 304 (the working path) fails at 308, CE 116 and NE1 102 may each independently detect the failure. Each may generate an APS message detailing such a determination and send it to each other along path 306.

Figure 3C:
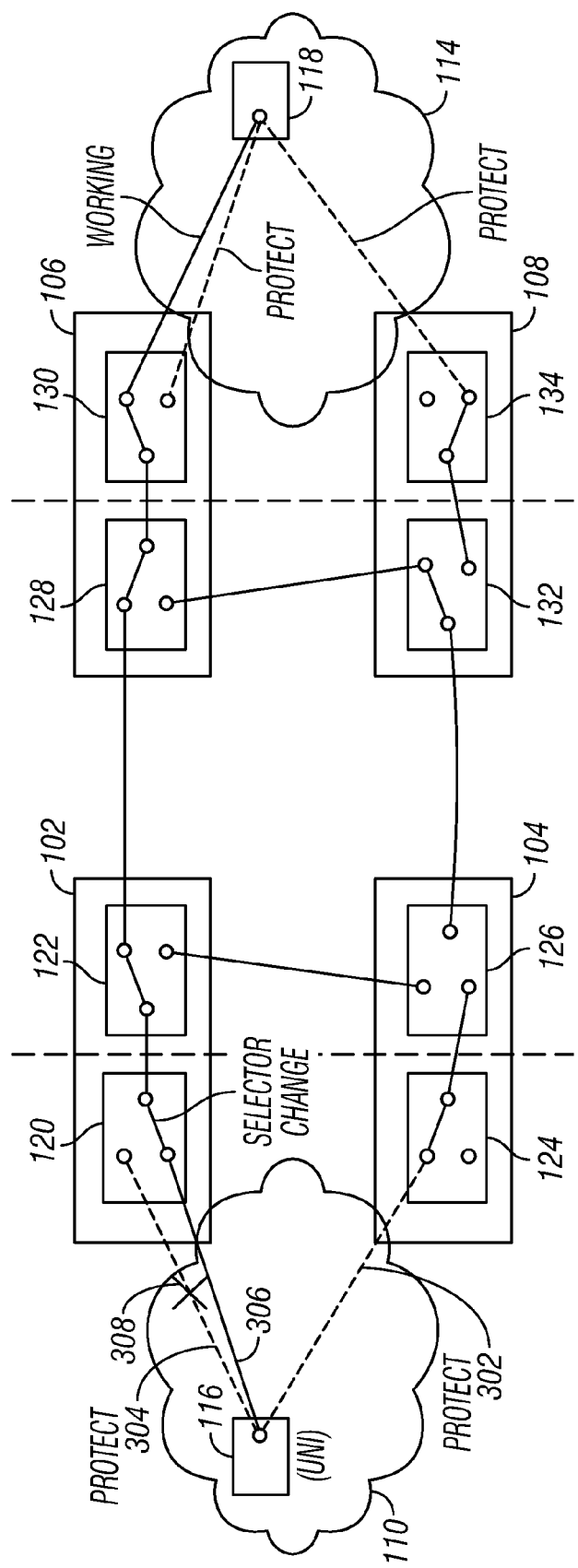
FIG. 3C illustrates example operation of a system to respond to detected link failure when using mesh distributed linear protection.

FIG. 3C illustrates example operation of system 100 to respond to detected link failure when using mesh distributed linear protection. System 100 may perform any suitable number or combination of selector changes within various SBs 120, 122, 124, 126, 128, 130, 132, 134. For example, NE1 102 may make a selector change in SB 120 to connect path 306 to SB 122 and the remainder of the previously existing path. The working path may then be designated as paths 306.

Figure 3D:
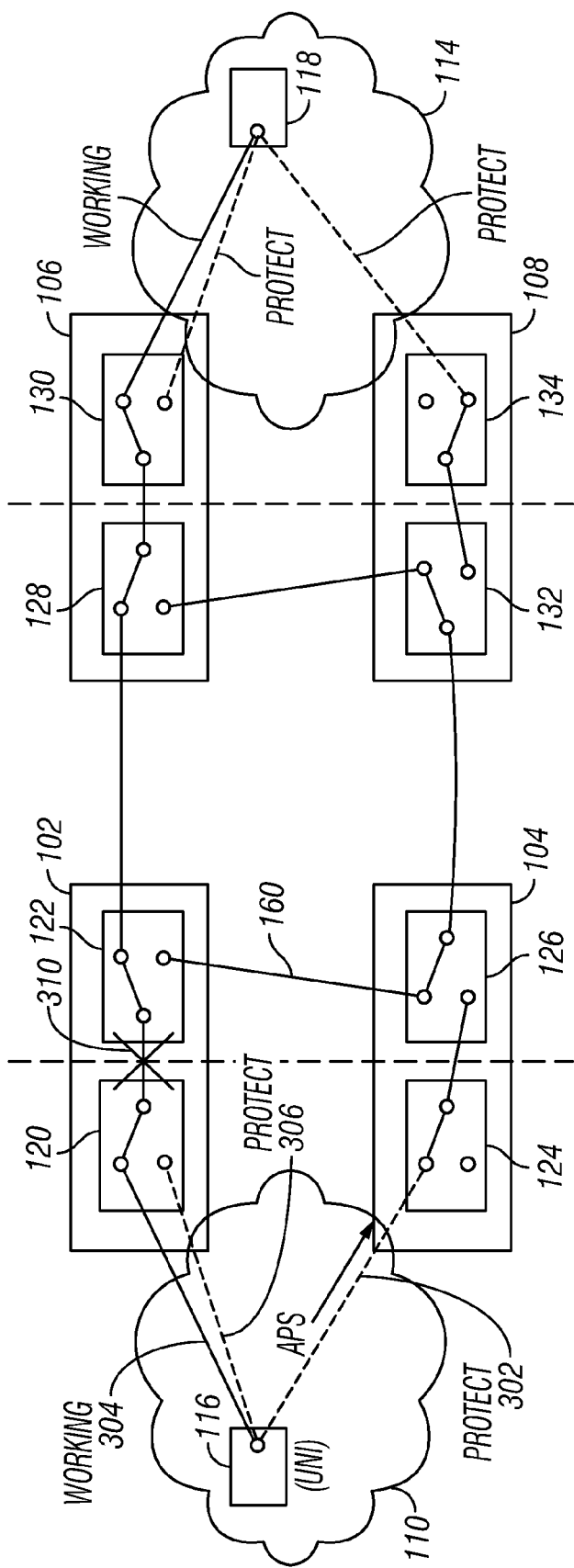
FIG. 3D illustrates example operation of a system to detect node failure when using mesh distributed linear protection.

FIG. 3D illustrates example operation of system 100 to detect node failure when using mesh distributed linear protection. Recovery from such node failure may be based upon a portal node detecting failure of another node from within the same portal. In one embodiment, system 100 may utilize triangulation to determine node failure. NE1 102 may be shared by both networks 110, 112.

In the example of FIG. 3D, NE1 102 may fail 310. CE 116 may detect the failure of both path 304 (including the working path) and path 306 (another protect path). CE 116 may send an APS message to NE2 104 on path 302 (the first protect path). NE2 104 may detect a resulting APS request from CE 116 over path 302. Furthermore, NE2 104 may fail to receive a message from NE1 102 over IPL 160. Such a message may be expected to be received if NE1 102 is operating normally. The message may include, for example, an APS message or a keep-alive message. In addition, NE2 104 may detect a loss of IPL 160.

NE2 104 may determine, based on the loss of APS messages from NE1 102 or other keep-alive messages, the loss of IPL 160, and the APS messages received from CE 116, that NE1 102 has failed.

Figure 3E:
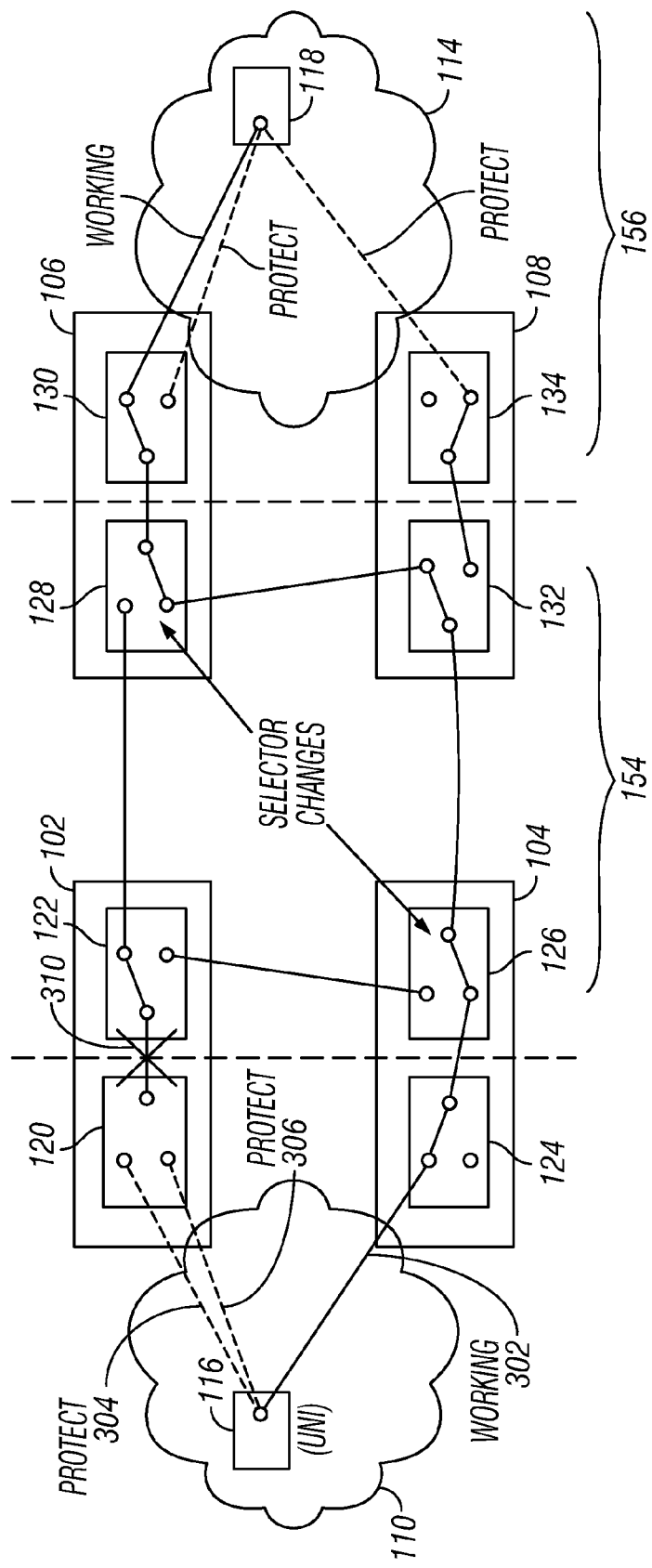
FIG. 3E illustrates example operation of a system to respond to detected node failure when using mesh distributed linear protection.

FIG. 3E illustrates example operation of system 100 to respond to detected node failure when using ring distributed linear protection. NE2 104 may NE2 104 may honor the APS request from CE 116. System 100 may perform any suitable number and combination of selector changes. For example, NE2 104 may make a selector change, if necessary, in SB 124 to route path 302 to SB 126, and, if necessary, in SB 126 to route its input from SB 124 to NE4 108. NE2 may activate the protect path on path 302 such that path 302 may now include the working path.

Other elements of domain 154 (configured as an E-NNI domain) may independently also detect failure of NE1 102 and provide similar switching of paths and selector changes within respective SBs. Each of the other elements, such as NE3 106 and NE4 108, may make such determinations in any suitable manner. For example, such other elements may make such determinations in similar fashion as NE2 104. In another example, NE4 108 may make such a determination upon receiving new input or APS messages from CE 116 or NE2 104. NE3 106 may make such a determination upon failing to receive input from NE1 102 and upon receiving new input or APS messages from NE4 108. Upon determining failure of NE1 102, NE4 108 may make a selector change, if necessary, in SB 132 to route its input from SB 126 of NE2 104 to SB 128 of NE3 106. Such routing may thus include routing over the IPL 162 between NE3 106 and NE4 108. NE3 106 may make a selector change, if necessary, in SB 128 to route its input from SB 132 of NE4 108 to SB 130 and on to CE 118. Thus, the protection domain of domain 156 in network 114 may require no changes.

The operation of NE1 102, NE2 104, NE3 106, or NE4 108 to detect and respond to node failure in system 100 may be established by configuring various pre-determined states of operation, depending upon the conditions encountered. Pre-determined states of operation may indicate any suitable information about operational settings or conditions encountered. For example, pre-determined states of operation may indicate to NE1 102, NE2 104, NE3 106, or NE4 108 which paths should be used for working path or protect path communication given the occurrence of a particular event.

Figure 4:
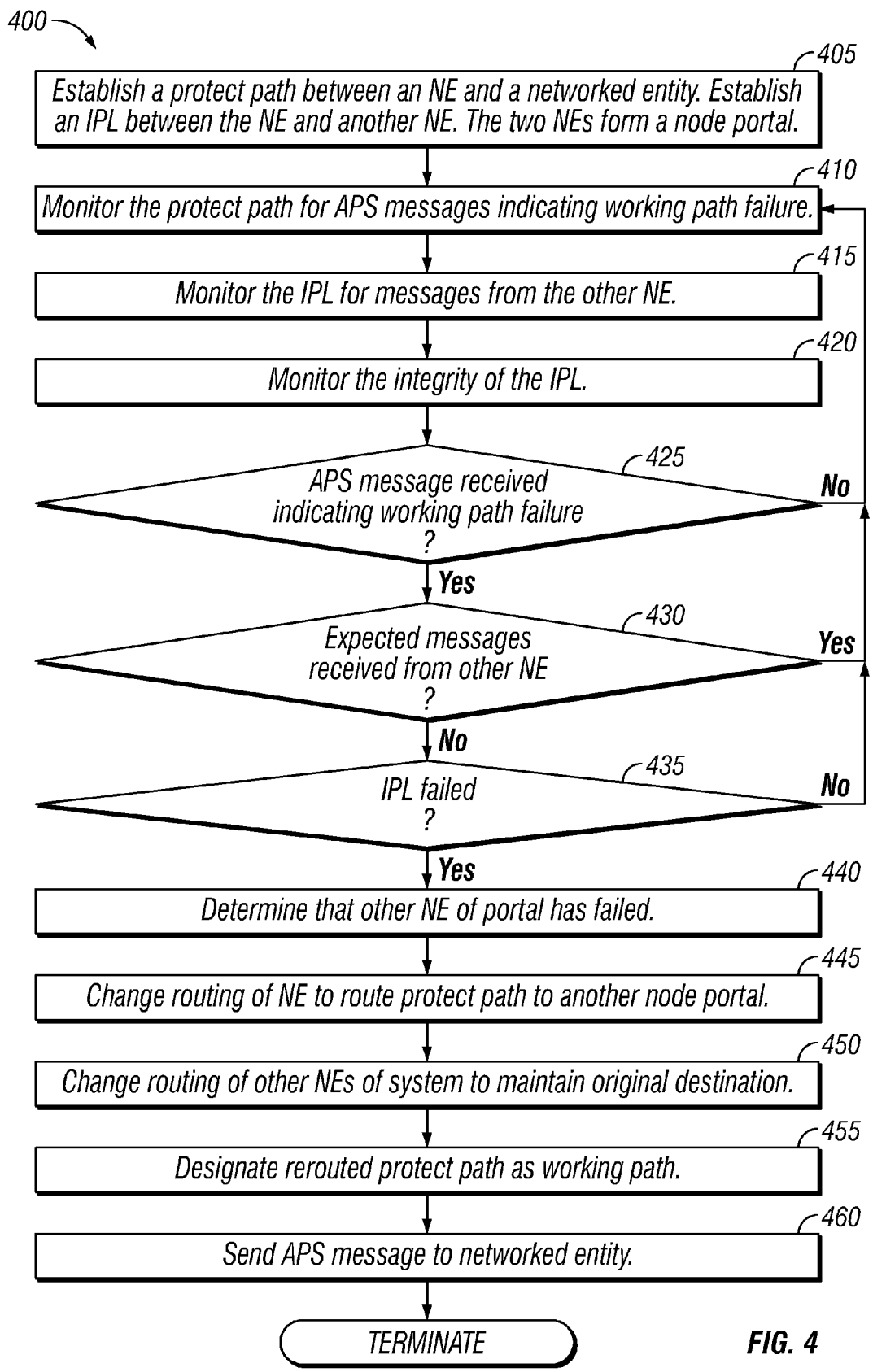
FIG. 4 illustrates an example embodiment of a method 400 for node failure detection.

FIG. 4 illustrates an example embodiment of a method 400 for node failure detection. In 405, at a NE within a system, a protect path and an IPL may be established. The protect path may be established between the NE and a networked entity. The IPL may be established with another NE. The NE and the other NE may form a portal of nodes by which the networked entity is provided linear protection. The network may utilize linear protection, such as Ethernet G.8031, OTN G.873.1, and MPLS-TP G.8131.1 and G.8131.2. Furthermore, the network may be configured according to mesh, ring, or hybrid mesh-ring topology. Using such a hybrid mesh-ring topology, the protection capacity of some ring links may be oversubscribed, such that a given ring link may protect working paths with greater capacity than itself. In addition, then network may be configured according to N2U, N2E, or N2N models.

At 410, the protect path may be monitored for APS messages indicating a working path failure from the networked entity. At 415, the IPL may be monitored for messages from the other NE of the portal. Such messages may be expected to be received if the NE is operating normally and may include, for example, APS messages or keep-alive messages. At 420, the IPL may be monitored for the integrity of the IPL itself.

At 425, it may be determined whether an APS message indicating a working path failure from the networked entity has been received. If not, method 400 may return to 410. If so, at 430, it may be determined whether any messages have been received from the other NE of the portal. Such messages may be expected to be received if the other NE of the portal is operating properly. The messages may include, for example, APS or keep-alive messages. If any messages have been received, method 400 may return to 410 or take corrective action with regards to the working path failure. If such messages have not been received, at 435 it may be determined whether the IPL path is active. If so, method 400 may return to 410 or take corrective action with regards to the working path failure or missing APS or keep-alive messages. If so, at 440 it may be determined that the other NE of the portal has failed. Any suitable corrective action may be taken.

For example, at 445, routing configuration of the NE may be changed so as to route the protect path to another node portal. Such routing may, for example, shift the protect path from away from IPL connecting the NE and the failed NE. At 450, other NEs of the system may adjust routing so as to accept the newly rerouted protect path and route it to the original intended destination. Such other NEs may include, for example, NEs of the other node portal. At 455, the rerouted protect path may be designated as the working path. At 460, an APS message may be sent to the networked entity informing the networked entity about the determined failure or the rerouting. The method may terminate.

The steps of method 400 may be conducted in parallel by different entities implementing method 400. Furthermore, method 400 may be conducted in parallel with other methods for providing linear protection. Although FIG. 4 discloses a particular number of steps to be taken with respect to an example method 400, method 400 may be executed with more or fewer steps than those depicted in FIG. 4. In addition, although FIG. 4 discloses a certain order of steps to be taken with respect to method 400, the steps comprising method 400 may be completed in any suitable order. Method 400 may be implemented using the system of FIGS. 1-3 or any other system, network, or device operable to implement method 400. In certain embodiments, method 400 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims

What is claimed is:

1. A method for linear protection, comprising, for a first network element communicatively coupled to a second network element, the first network element and the second network element included in a first node portal located at the edge of a first administrative network domain:
   monitoring, by the first network element, a protection path for an automatic protection switching ("APS") message from a third network element included within a network attached to the first node portal, the APS message indicating a failure of a working path between the second network element and the third network element;
   determining, by the first network element, that the APS message has been received;
   monitoring, by the first network element, an intraportal link for a message from the second network element;
   determining, by the first network element, that the message from the second network element has not been received;
   monitoring, by the first network element, integrity of the intraportal link;
   determining, by the first network element, that the intraportal link has failed;
   determining, by the first network element, that the second network element has failed based upon determining that that the APS message has been received, that the message from the second network element has not been received, and that the intraportal link has failed;
   activating the protection path; and
   transmitting data between the third network element and a node within a second node portal communicatively coupled to the first node portal and located across a second administrative network domain, the transmitting data bypassing the second network element.

2. The method of claim 1, further comprising activating the protection path by changing a switch position of a selector function of the first network element.

3. The method of claim 1, further comprising sending an APS message to the third network element based upon the determination that the second network element has failed.

4. The method of claim 1, further comprising designating the protection path as a working path after a protection switching event.

5. The method of claim 1, wherein the first network element is configured to communicate using G.8031 Ethernet Linear Protection, G.873.1 Optical Transport Network Linear Protection, or Multiprotocol Label Switching Transport Profile Linear Protection G.8131.1 and G.8131.2 standards.

6. The method of claim 1, wherein the first network element is configured to provide linear protection as part of a mesh network model, ring network model, or hybrid mesh-ring network model.

7. The method of claim 1, wherein the first network element is configured to provide linear protection in conjunction with a single-homed or dual-homed user network interface (UNI).

8. The method of claim 1, wherein the first network element is configured to provide linear protection as part of a Network-to-UNI model, Network-to-Ethernet-Network-Interface model, or Network-to-Network model.

9. An article of manufacture comprising:
a computer readable medium; and
computer-executable instructions carried on the computer readable medium, the instructions readable by a processor, the instructions, when read and executed, for causing the processor to, for a first network element communicatively coupled to a second network element, the first network element and the second network element included in a first node portal located at the edge of a first administrative network domain:
monitor, by the first network element, a protection path for an automatic protection switching ("APS") message from a third network element included within a network attached to the first node portal, the APS message indicating a failure of a working path between the second network element and the third network element;
determine, by the first network element, that the APS message has been received;
monitor, by the first network element, an intraportal link for a message from the second network element;
determine, by the first network element, that the message from the second network element has not been received;
monitor, by the first network element, integrity of the intraportal link;
determine, by the first network element, that the intraportal link has failed;
determine, by the first network element, that the second network element has failed based upon determining that that the APS message has been received, that the message from the second network element has not been received, and that the intraportal link has failed;
activate the protection path; and
transmit data between the third network element and a node within a second node portal communicatively coupled to the first node portal and located across a second administrative network domain, the transmitting data by passing the second network element.

10. The article of claim 9, further comprising instructions for causing the processor to
change the routing of the first network element to route the protection path to a second node portal based on the determination that the second network element has failed.

11. The article of claim 9, further comprising instructions for causing the processor to activate the protection path by changing a switch position of a selector function of the first network element.

12. The article of claim 9, further comprising instructions for causing the processor to send an APS message to the third networked element based upon the determination that the second network element has failed.

13. The article of claim 9, further comprising instructions for causing the processor to designate the protection path as a working path after a protection switching event.

14. The article of claim 9, wherein the first network element is configured to communicate using G.8031 Ethernet Linear Protection, G.873.1 Optical Transport Network Linear Protection, or Multiprotocol Label Switching Transport Profile Linear Protection G.8131.1 and G.8131.2 standards.

15. The article of claim 9, wherein the first network element is configured to provide linear protection as part of a mesh network model, ring network model, or hybrid mesh-ring network model.

16. The article of claim 9, wherein the first network element is configured to provide linear protection in conjunction with a single-homed or dual-homed user network interface (UNI).

17. The article of claim 9, wherein the first network element is configured to provide linear protection as part of a Network-to-UNI model, Network-to-Ethernet-Network-Interface model, or Network-to-Network model.

18. A system comprising:
a first network element; and
a second network element communicatively coupled to the first network element through an intraportal link forming a first node portal;
wherein the first network element is communicatively coupled to a third network element within a network attached to the first node portal and the first network element is configured to:
monitor a protection path for an automatic protection switching ("APS") message from the third network element, the APS message indicating a failure of a working path between the second network element and the third network element;
determine that the APS message has been received;
monitor the intraportal link for a message from the second network element;
determine that the message from the second network element has not been received;
monitor integrity of the intraportal link;
determine that the intraportal link has failed;
determine that the second network element has failed based upon determining that that the APS message has been received, that the message from the second network element has not been received, and that the intraportal link has failed;
activate the protection path; and
transmit data between the third network element and a node within a second node portal communicatively coupled to the first node portal and located across a second administrative network domain, the transmitting data bypassing the second network element.

19. The system of claim 18, wherein the first network element is further configured to
change the routing of the first network element to route the protection path to a second node portal based on the determination that the second network element has failed.

20. The system of claim 18, wherein the first network element is further configured to activate the protection path by changing a switch position of a selector function of the first network element.

21. The system of claim 18, wherein the first network element is further configured to send an APS message to the third networked element based upon the determination that the second network element has failed.

22. The system of claim 18, wherein the first network element is further configured to designate the protection path as a working path after a protection switching event.

23. The system of claim 18, wherein the first network element is configured to communicate using G.8031 Ethernet Linear Protection, G.873.1 Optical Transport Network Linear Protection, or Multiprotocol Label Switching Transport Profile Linear Protection G.8131.1 and G.8131.2 standards.

24. The system of claim 18, wherein the first network element is configured to provide linear protection as part of a mesh network model, ring network model, or hybrid mesh-ring network model.

25. The system of claim 18, wherein the first network element is configured to provide linear protection in conjunction with a single-homed or dual-homed user network interface (UNI).

26. The system of claim 18, wherein the first network element is configured to provide linear protection as part of a Network-to-UNI model, Network-to-Ethernet-Network-Interface model, or Network-to-Network model.

* * * * *